(12) United States Patent
Martinez Barrado

(10) Patent No.: US 6,364,996 B1
(45) Date of Patent: Apr. 2, 2002

(54) DEVICE FOR TREATMENT AND REMOVAL OF AQUEOUS LIQUIDS BY CONTROLLED ATMOSPHERIC ACTION

(75) Inventor: Jose Manuel Martinez Barrado, Zaragoza (ES)

(73) Assignee: Igenieria Y Circuitos, S.L., Zaragoza (ES)

( * ) Notice: Subject to any disclaimer, the term of this patent is extended or adjusted under 35 U.S.C. 154(b) by 0 days.

(21) Appl. No.: 09/254,964
(22) PCT Filed: Jul. 17, 1998
(86) PCT No.: PCT/ES98/00210
§ 371 Date: May 26, 1999
§ 102(e) Date: May 26, 1999
(87) PCT Pub. No.: WO99/03785
PCT Pub. Date: Jan. 28, 1999

(30) Foreign Application Priority Data

Jul. 18, 1997 (ES) .............................. 9701598

(51) Int. Cl.⁷ .............................. B01D 3/34; C02F 1/12
(52) U.S. Cl. .................... 159/16.1; 159/4.01; 159/27.3; 159/48.1; 159/901; 159/DIG. 8; 203/14; 203/71; 210/150; 210/151; 210/615; 210/622; 261/76; 261/81
(58) Field of Search .......................... 202/236; 159/34, 159/45, 4.01, 16.1, DIG. 15, 48.1, 901, 27.3, DIG. 8; 203/49, 10, 90, 47, 12, 48, 98, 86, 14, 71; 210/2.95, 150, 151, 615, 610–622, 629; 261/2, 5, 44.4, 76, 78.1, 81, 111, 115–116

(56) References Cited

U.S. PATENT DOCUMENTS 3,679,053 A * 7/1972 Koulovatos et al. .......... 210/86
3,864,932 A   2/1975 Hslao
4,731,520 A * 3/1988 Glucksman et al. ........ 219/271
4,857,185 A   8/1989 Desjardins
5,096,543 A   3/1992 Elmore

FOREIGN PATENT DOCUMENTS

EP    000054720   * 6/1982
JP    5031479 A     2/1993

* cited by examiner

Primary Examiner—Virginia Manoharan
(74) Attorney, Agent, or Firm—Rosenman & Colin LLP

(57) ABSTRACT

A bifurcated fan (1) which draws in atmospheric air through air/liquid contact blocks of plastic grids which are sprayed with the liquid to be treated. The blocks change position in order to be sprayed on both front surfaces alternatively and thus remain clean. The liquid evaporates in the contact blocks and the concentrate is dehydrated in a secondary laminar evaporation base. The arrangement into converging sectors provides a geometry with minimal aerodynamic losses in a liquid with organic matter. The device includes a central tank which facilitates an aerobic biopurification process aided by the oxygenation in the contact blocks. Thermal exchanges may be included at the air inlet, using residual energy, particularly from thermal engines to which it provides refrigeration and cleaning of exhaust gases.

15 Claims, 2 Drawing Sheets

Figure 1:
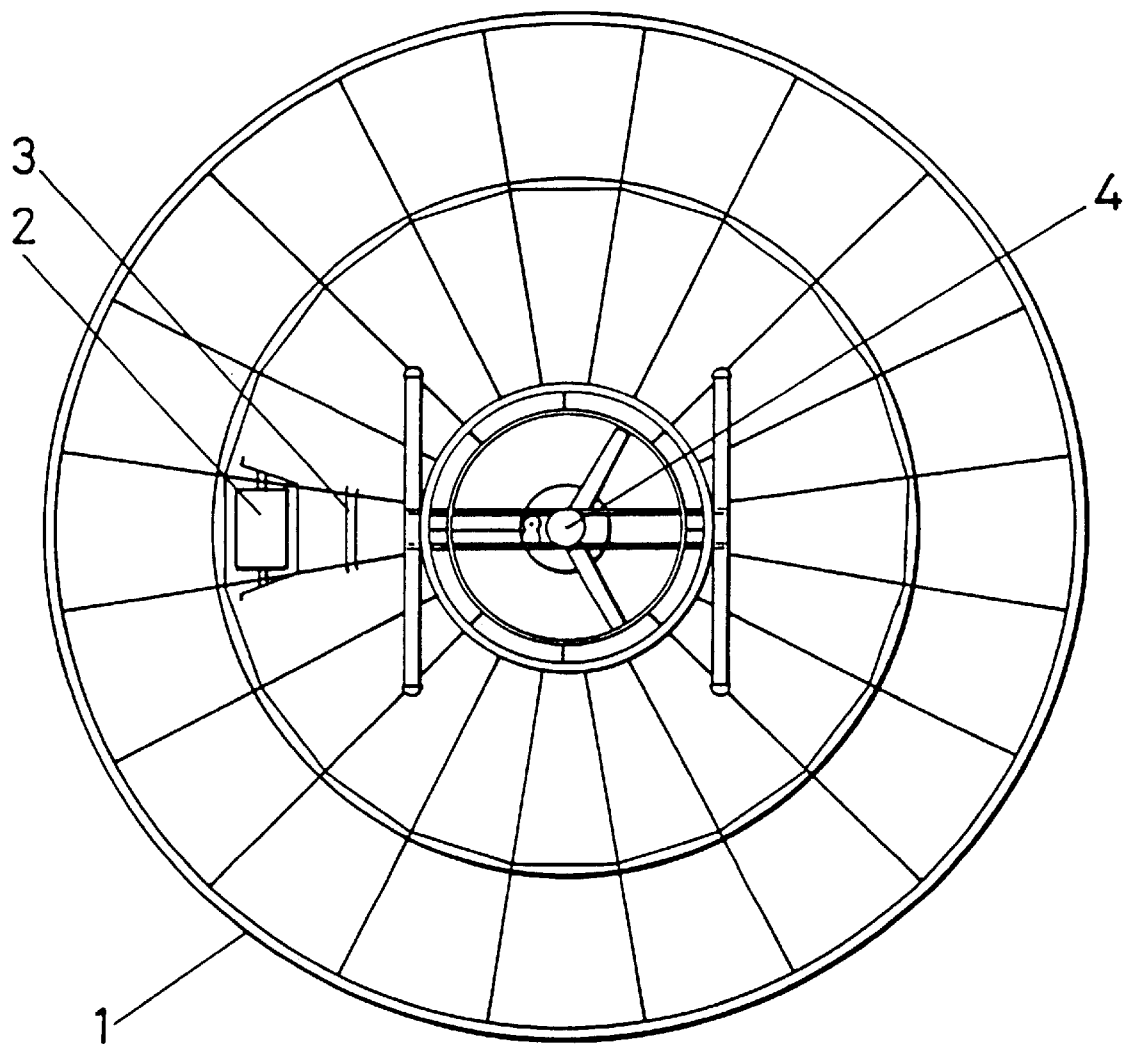
Figure 2:
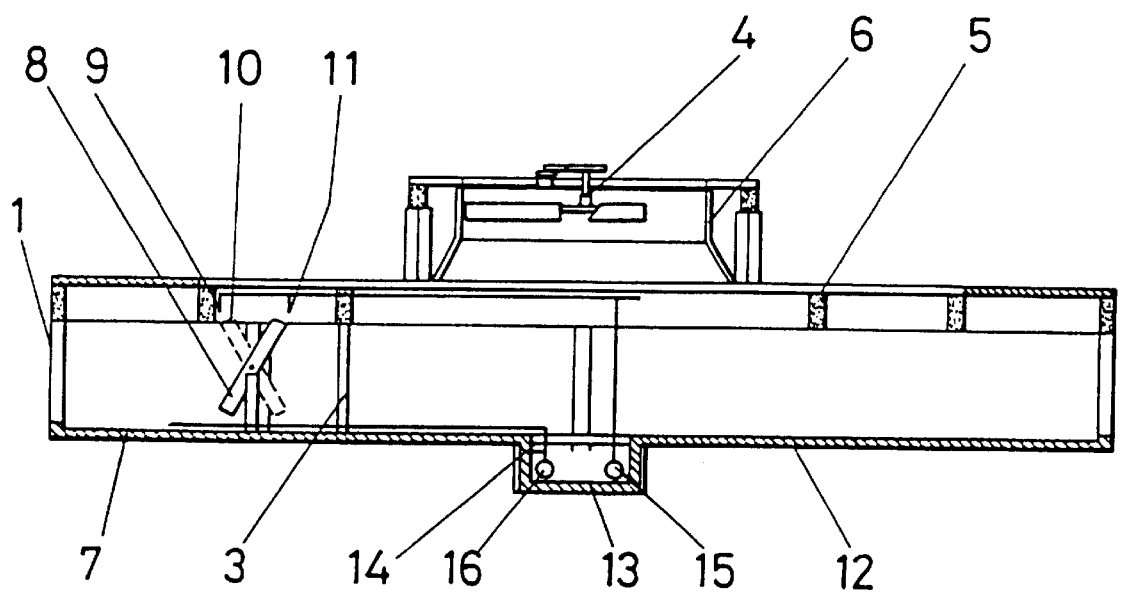

DEVICE FOR TREATMENT AND REMOVAL OF AQUEOUS LIQUIDS BY CONTROLLED ATMOSPHERIC ACTION

The present invention refers to a device which introduces improvements in concession systems by evaporation of aqueous liquids in atmospheric air.

These systems rely on blocks which provide a large air/liquid contact area and which are sprayed by low-pressure sprinklers.

In air/liquid contact processes since 1970 a specific type of contact surface block is being used which is based on a plastic grid mounted on three-dimensional conducts, which shows very good properties for evaporation of aqueous liquids.

The present patent corresponds to a device which introduces significant improvements in the use of these contact blocks, increasing their effectiveness and achieving the following goals:

Introducing the possibility of carrying out the sprinkling from either the front or rear face of the blocks, as desired, by changing their physical position, thus achieving their self-cleaning.

Incorporating a secondary evaporation stage to the system sized in order to dehydrate and carry the concentrated liquid in the contact blocks to a solid configuration.

Benefit from the oxygenation of the liquid during contact with air so that, in the event there is organic matter in the liquid, a aerobic biological purification filter is introduced.

Using an air circulation configuration which causes minimum air resistance with a minimum ventilation energy consumption.
- Allowing installation in the air inlet of thermal exchange elements in order to improve the properties of the atmospheric air by taking advantage of residual energy, particularly from the thermal engines.

Achieving the above goals in an aqueous liquid concentration device provides a process which can be applied with full efficiency to the elimination of polluted effluents and with the following advantages over other systems:

- The process is very simple: evaporation occurs at room temperature with the recirculation pump for the liquid to be disposed of and the air intake fan being virtually the only mechanisms.
- Air/liquid contact blocks are self-cleaning, which reduces maintenance, maintains a maximum degree of evaporation capacity and allows extending the concentration as much as possible.
- The liquid concentration is carried to the precipitation of the dissolved solids or to the dehydration of the residual mud, depending on the initial type of spillage, so that its disposal ends with its transfer to a controlled dump or its use in ulterior processes.
- The minimised loss of aerodynamic load of the air reduces the operational cost of the process.
- The use of residual thermal energy to improve atmospheric air properties, particularly the residual thermal energy of thermal engines.

According to the above description the invention is characterised by employing a mechanism which allows alternate spraying of each contact block face.

In addition, it is characterised by incorporation of a secondary evaporation dehydration stage which takes the concentrate obtained from the recirculation of the liquid on the contact blocks to a solid configuration.

A further additional characteristic is the incorporation in the system of a stage for taking advantage of the oxygenation of the liquid in the form of a biological filter.

A further characteristic is use of construction designs which minimise the energy needed for air flow.

A final characteristic of the system is the possibility of incorporating thermal exchange elements at the air inlet in order to improve its properties by taking advantage of residual thermal energy.

Below is described in greater detail the device object of the invention, with reference to the accompanying drawings, taking into account that these show a preferred embodiment of the device object of this application, albeit a non-limiting one.

BRIEF DESCRIPTION OF THE DRAWINGS

In said drawings,

FIG. 1 shows a plan view of the complete device object of the invention;

FIG. 2 is a cross sectional view of the same.

DESCRIPTION OF THE PREFERRED EMBODIMENTS:

FIG. 1 shows the circular plan layout of the device and shows the detailed composition of the repeated sectors converging under the bifurcated air inlet fan. In this figure, 1 is the air inlet opening; 2 is the air/liquid contact block; 3 is the block for separating possible drops carried by the air; and 4 is the bifurcated fan which draws in the air.

FIG. 2 is a vertical cross-section of one of the converging sectors of the device, where 5 is the top cover, 6 is the air outlet aerodynamic passage and once again 4 is the bifurcated fan.

With this layout aerodynamics are optimised, with a minimum loss of water.

Continuing in FIG. 2, 1 is again the air inlet and 7 is the concentrate dehydration platform, 8 is the contact block in the position where it is sprayed by sprinkler 9, and 10 is the same block in the alternative position, sprayed by sprinkler 11.

Collection platform 12 carries the recirculated liquid to tank 13 which is sized according to the characteristics of the biological filter if there is organic matter in the liquid. This sizing is reinforced if necessary by installing surface extension units 14 which improve the habitat of the aerobic bacterial colony in tank 13.

Continuing with FIG. 2, 15 is the liquid recirculation pump on the contact blocks and 16 is the concentrate drain pump on dehydration platform 7.

During system operation air drawn in by bifurcated fan 4 enters through 1 into the converging sectors into which the circular body of the device is divided. The air circulates over the concentrate dehydration platform 7, which arrives from tank 13 by drain pump 16.

Platform 7 is sized in such a way that unsaturated air entering evaporates the water remaining in the concentrate until a solid configuration concentrate is obtained. This sizing is independent of the properties of the incoming air, and depends only on the ratio between the water to be extracted in the concentration stage (contact blocks) and the water to be extracted in the dehydration stage (platform), a ratio which is determined by the relationship between the air/liquid contact surface in the contact blocks and the surface area of the dehydration platform.

The air, which is slightly moistened by the dehydration stage, passes through contact block 2, either in position 8 or in the alternative position 10. In each of the alternative positions sprinklers 9 or 11 spray the liquid on the front surface of the block, restoring the liquid evaporated by the passing air and mechanically cleaning the block passages.

This cleaning is really efficient up to a certain depth in the block from its front surface, where the liquid impacts, so that the alternation of the surface sprayed ensures the permanent and total cleaning of the block.

The alternation frequency is experimentally set in each particular application, and the block tipper may be manual or automatic, and so also the alternation sequence may be manual or automatic.

The contact block may be intermittently sprayed thanks to its capacity for holding water, which results in significant power saving in pumping liquid to the sprinklers.

The liquid propelled onto the blocks drains towards platform 12 which carries it by sliding to central tank 13 where pump 15 resends it to the sprinklers, thus maintaining recirculation.

The evaporated liquid is replaced in tank 13 by the liquid directly from the spillage liquid or after a regulating tank.

In the event there is biodegradable organic matter in the spilled liquid the strong oxygenation which it undergoes in its recirculation on the contact blocks is used to generate an aerobic biofilter in the system. In order to do this central tank 14 is sized so that it may house the corresponding biomass colony, occasionally installing conventional surface extension units.

The biomass is so placed in the central tank, the possibility of its remaining in the contact blocks being avoided by the alternate spraying of both sides, making the block an inadequate space for the biomass.

The mud generated in central tank 13 by the biomass is extracted by drain pump 16 and sent to the dehydration platform 7.

In order to use the thermal energy for preheating the air, energy releasing devices are placed at the air inlet, in the form of exchangers when the thermal energy is transported by a liquid or in the form of discharge diffusers if the thermal energy is available as hot gases.

In the characteristic application of recovering residual energy from thermal engines, part of this energy is transported by the cooling water and part by the exhaust gases. In this application the device object of this patent performs a double function on the engines: it provides cooling and cleans the exhaust gases as they are diluted in the air carried by the device and later pass through the contact blocks which act as filters.

It is essential in the device described that it may spray liquid on alternate faces of the contact blocks for their correct cleanliness. It is also essential that there is a first evaporation stage for the dehydration of the concentrates to achieve a solid configuration.

Also essential to the device is the inclusion of a biological filtering stage when there is organic matter in the oxygenated liquid in the contact blocks. Essential as well is the arrangement of the air flow in linear sectors converging under the bifurcated inlet fan, thus obtaining aerodynamically optimum circulation.

Lastly, also in the essence of the device is the possibility existing in the device, in the event of using the residual energy of thermal engines to improve the properties of the air, of providing refrigeration of the cooling water and cleaning the exhaust gases.

Not essential to the device is its size, nor that of its different components, nor the construction material, nor the arrangement of the mechanism for altering the position of the contact blocks, nor the arrangement of the heat transfer elements in the improved air version, nor the nature of the biomass support block in the biofilter version.

In the following the nature of the invention is described, as well as the way in which it can be advantageously carried out in practice, and it is shown how it constitutes a positive development in effluent disposal by controlled atmospheric action technology, stating that the aforementioned are subject to alteration of their details as long as the fundamental process is not altered, the essence of the invention lying in what is set forth in the following.

What is claimed is:

1. A device for the treatment and disposal of aqueous liquids by controlled atmospheric action comprising:

a contact block arranged in a grid, said contact block having a first surface and a second surface, a tank for holding liquid to be treated, and a plurality of sprinklers for sprinkling said liquid on said contact block, said contact block being movable so as to alternatively expose said first and second surfaces to said plurality of sprinklers, means for drawing air across said contact block to evaporate said liquid from said contact block and form a liquid concentrate in a first dehydration stage, means for collecting said liquid concentrate in said tank, means for pumping said liquid concentrate onto a dehydration platform, and means for drawing air across said liquid concentrate pumped onto said dehydration platform to produce a solid concentrate in a second dehydration stage.

2. A device in accordance with claim 1, wherein said means for pumping comprises a solid draining pump disposed within said tank.

3. A device in accordance with claim 2, further comprising a recycling pump in said tank for recycling liquid contained in said tank through said contact block.

4. A device in accordance with claim 3, wherein said tank is further provided with extension units for increasing the capacity of said tank and for aerobically treating the liquid in said tank as a result of the increased size of said tank and the constant recycling of liquid from said tank over said contact block.

5. A device in accordance with 3, wherein said means for drawing air across said contact block further comprises an air intake fan.

6. A device in accordance with claim 5, wherein said device further comprises a plurality of contact blocks circularly arranged and perimetric openings through which air is circulated and drawn across said blocks by said fan.

7. A device in accordance with claim 1, further comprising the biological filter means when there is organic matter in oxygenated liquid in said contact block.

8. A method of treating and disposing of aqueous liquids by controlled atmospheric action comprising the steps of:

spraying liquid from a tank onto a movable contact block arranged in a grid, said contact block having a first surface and a second surface that are alternately exposed to said sprayed liquid, drawing air across said movable contact block to evaporate said liquid from said movable contact block and form a liquid concentrate in a first dehydration stage, collecting said liquid concentrate in said tank, pumping said liquid concentrate onto a dehydration platform, and drawing air across said liquid concentrate pumped onto said dehydration platform to produce a solid concentrate in a second dehydration stage.

9. A method in accordance with claim 8, further comprising the step of collecting excess liquid sprayed onto said movable contact block and recycling said liquid by re-spraying said collected excess liquid onto said movable contact block.

10. A method in accordance with claim 9, wherein said recycling of said liquid is accomplished by a recycling pump disposed in said tank.

11. A method in accordance with claim 9, further comprising the steps of:

spraying of a plurality of movable contact blocks radially disposed in a circular arrangement, and drawing air linearly across said plurality of movable contact blocks in said first dehydration stage.

12. A method in accordance with claim 11, wherein air is drawn across said contact blocks and across said dehydration platform by a fan centrally located with respect to said contact blocks.

13. A method in accordance with claim 8, wherein said spraying is accomplished by a plurality of sprinklers.

14. A method in accordance with claim 8, wherein said pumping is accomplished by a draining pump disposed within said tank.

15. A method in accordance with claim 8, further comprising He step of providing a biological filter means when there is organic matter in oxygenated liquid in said contact block.

* * * * *